No. 724,066. PATENTED MAR. 31, 1903.
J. WHITING.
PYROMETER.
APPLICATION FILED MAY 5, 1902.
NO MODEL.
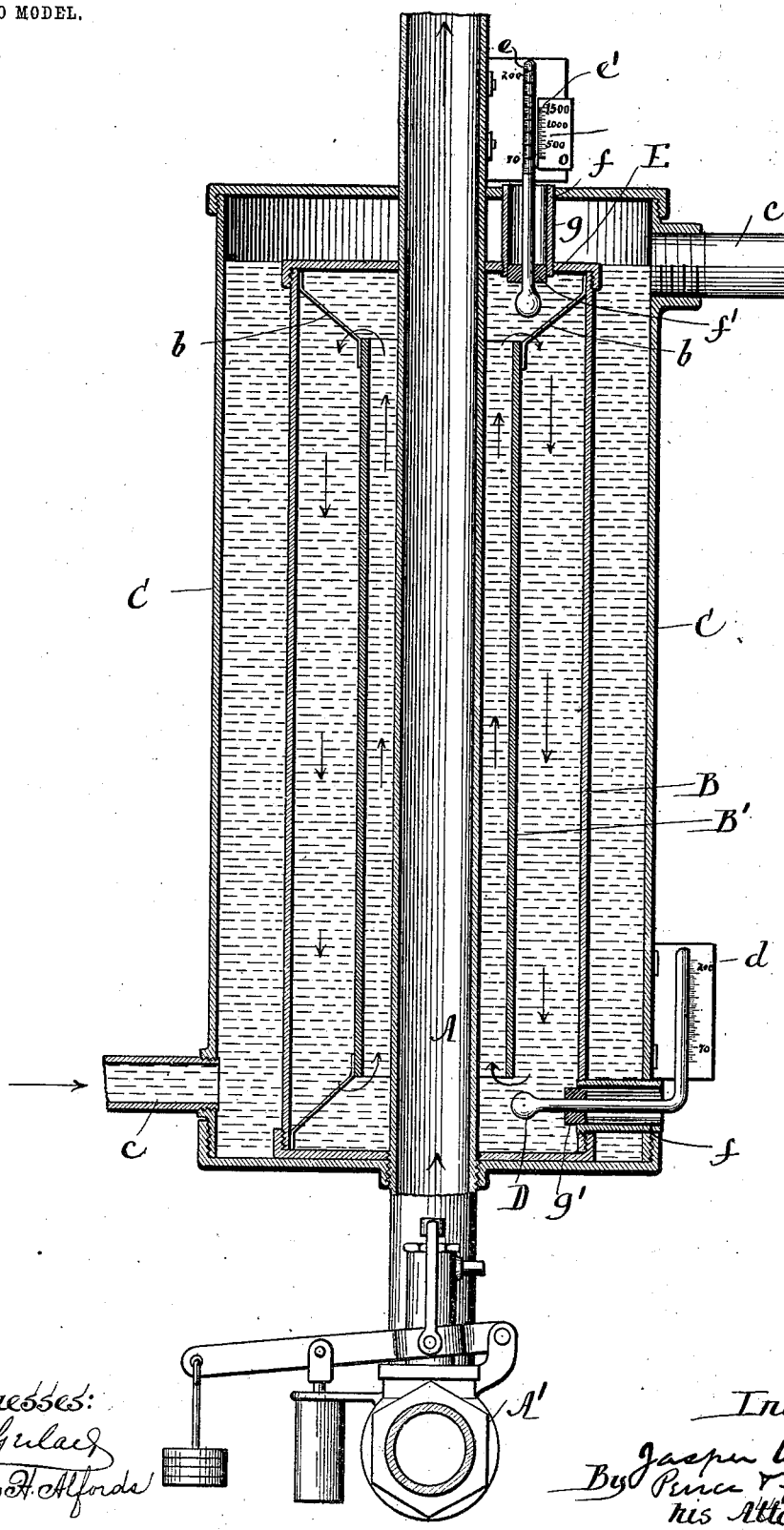
Witnesses:
Inventor:
Jasper Whiting
By Pierce & Fisher
his Attorneys.

UNITED STATES PATENT OFFICE.

JASPER WHITING, OF BOSTON, MASSACHUSETTS.

PYROMETER.

SPECIFICATION forming part of Letters Patent No. 724,066, dated March 31, 1903.

Application filed May 5, 1902. Serial No. 105,897. (No model.)

*To all whom it may concern:*

Be it known that I, JASPER WHITING, a citizen of the United States, and a resident of Boston, in the county of Suffolk and State of Massachusetts, have invented certain new and useful Improvements in Pyrometers, of which the following is a full, clear, and exact description.

This invention has for its object to provide a simple and effective construction of pyrometer more especially designed for determining the temperature of gases (by which term is included air, artificial and natural gases, &c.) delivered to blast-furnaces or otherwise employed in metallurgical or other operations.

The invention resides in the features of improvement hereinafter described, illustrated in the accompanying drawing, and particularly pointed out in the claims at the end of this specification.

Pyrometers of various kinds have been heretofore employed for measuring the very high temperatures of the hot blasts used in metallurgical operations; but such devices have been more or less complicated or their use has been attended with more or less serious objections. For example, in some pyrometers previously used a stream of water flows through a pipe or passage which is exposed to the source of heat to be measured and the temperature of the flowing stream ascertained at the inlet and outlet. By previous calibration the temperature of the source of heat may be ascertained with such a pyrometer from the differences of temperature of the water at the inlet and outlet; but if exposed to high temperatures the wall of the pipe or passage of the pyrometer soon becomes incrusted with deposits of impurities contained in the water and the instrument is thus rendered inaccurate.

The present invention contemplates the employment of a body of liquid (preferably distilled water) in closed circulation—i. e., the same body of water is maintained in circulation over and over again—exposed at one part to the hot gas the temperature of which is to be ascertained and exposed at another part to a cooling agent that will reduce the temperature of the body of circulating liquid from the maximum point to which it has been raised by exposure to the hot gas to approximately the temperature of the cooling agent, means being provided for ascertaining the increase in temperature imparted to the body of circulating liquid by the gas—i. e., the difference in temperature between the hot and cold portions of the body of circulating liquid is ascertained.

The preferred embodiment of the invention is illustrated in the accompanying drawing, which is a view in central vertical section through a pyrometer embracing one form of the invention.

A designates the pipe through which will pass a supply of hot gas the temperature of which is to be measured. The pipe A will lead from the blast-pipe or source of gas-supply and by preference will be provided with a suitable pressure-regulating valve contained within a casing A'. Any form of regulating-valve may be provided, so long as it is adapted to withstand the high temperatures and other conditions to which it will be exposed.

About the pipe A is fitted a water-tight reservoir or chamber B, through the ends of which the pipe A passes, and within the reservoir B is preferably placed a tubular diaphragm or partition B', suspended, as by rods $b$, at a distance from and preferably concentric with the pipe A and the outer wall of the reservoir B. The reservoir B will be filled with distilled water or other liquid that will avoid the incrustation of the walls of the pipe A and reservoir B. Preferably the pipe A will be formed of aluminium or like material that will be a good conductor of heat and will not be injured by the gases passing therethrough. By preference also the walls of the reservoir B will be of brass or iron or like good heat-conducting material, while the tubular diaphragm or partition B' will be of hard rubber, tile, or other suitable material of low heat conductivity.

Around the reservoir B extends a water-jacket C, that is provided with a pipe $c$ for the admission and with a pipe $c'$ for the discharge of water that will be delivered to the jacket from the city main or other suitable source of supply.

Within the lower part of the reservoir B is inserted the bulb of a thermometer D, the stem or body of the thermometer extending through the wall of the reservoir B and water-jacket C and being preferably upturned, as shown, and provided with a scale $d$, suitably graduated to permit the heat measurements indicated by the thermometer to be readily ascertained. In like manner the thermometer E has its bulb setting within the top of the reservoir B, and the stem of this thermometer E extends outside the water-jacket and is furnished, preferably, with two scales $e$ and $e'$. The scale $e$ will be marked with graduations corresponding to the graduations of the scale $d$ of the thermometer D, but the scale $e$ will be an adjustable scale, with graduations from the lowest to the highest temperatures for which the pyrometer will be employed. The thermometers D and E may be conveniently held in place within sleeves or tubes $f$, that are threaded to engage correspondingly-threaded holes formed in the reservoir B and water-jacket C, the thermometers being held in position within the tubes in any suitable manner—as, for example, by gaskets or stuffing-boxes $f'$ and $g'$—that will prevent the escape of liquid through the tubes. Obviously, however, any suitable means may be employed for holding the thermometers in position without departing from the scope of the invention.

From the foregoing description the operation of my improved pyrometer will be seen to be as follows: The gas the temperature of which is to be ascertained will pass from the source of supply through the pipe A, the pressure of gas within the pipe being preferably rendered uniform by the regulating-valve within the casing A'. Where the supply of gas is of uniform pressure, the reducing-valve need not be used. As the distilled water within the reservoir B is exposed at one point to the heat of the pipe A and at another point to the cooling action of the body of water within the jacket C, a closed circulation of the distilled water around the diaphragm B' will be effected, as indicated by the arrows upon the drawing. As the water thus circulates upward along the pipe A its temperature rises, the maximum temperature occurring at the top of the reservoir, but as the water descends outside the diaphragm B' its temperature is reduced by contact with the outer wall of the reservoir B. The surface exposure of the reservoir B to the cooling action of the water within the water-jacket C should be sufficient to extract from the distilled water as it passes to the bottom of the reservoir substantially all the heat imparted to it during its upward passage along the pipe A, so that the temperature at the bottom of the reservoir B as indicated by the thermometer D shall be practically constant with respect to the temperature of the water flowing through the water-jacket C. In practice the degree of temperature indicated by the thermometer D will determine the corresponding point of the scale $e$ at which the zero-point of the adjustable scale $e'$ of the thermometer E will be set. As the scale $e'$ is graduated from zero to the highest temperature to be indicated, it follows that not only will the rise in temperature of the water in reservoir B be indicated on the scale $e$, but the corresponding temperature of the gas passing through pipe A will also be directly shown by the scale $e'$. Thus, for example, if the thermometer D indicate, say, 70° Fahrenheit the zero-point of the scale $e'$ will be set opposite to the corresponding point (70°) on the scale $e$. If then the temperature of the gas passing through the pipe A be, say, 1,500°, the thermometer E will indicate such degree upon scale $e'$ while indicating at the same time on the scale $e$ the actual rise of temperature—say to 150°—due to the contact of the distilled water within the reservoir with the pipe A.

The pyrometer will of course be first calibrated with valve A' set to maintain a fixed definite pressure within passage A—as, for example, by means of a Le Chatilier pyrometer inserted in gas-pipe A—in order that the temperature of the hot gas may be accurately ascertained from the differences in temperature between the hot and cold portions or so that the temperature of the hot gas may be read directly from scale $e'$ of thermometer E. Manifestly, however, the specific means employed for determining the rise in temperature of the body of distilled water within the reservoir B is not essential to the invention. Moreover, if the temperature of the cooling water is known or is fairly constant the pyrometer and its thermometer E may be so calibrated that the thermometer D may be dispensed with.

While I have described what I regard as the preferred embodiment of my invention, it will be understood that the details of construction may be varied within wide limits without departure from the spirit of the invention, although, preferably, it is not essential that the cooling of the circulating liquid within the reservoir shall be effected by the surrounding water-jacket; nor is it essential that the reservoir should be of any particular type, so long as its construction is such as to insure a closed circulation of the liquid therein. I believe that this invention presents the first instance of a pyrometer employing a body of liquid in closed circulation exposed at one point to the heat of the gas the temperature of which is to be determined and exposed at another point to a cooling agent that restores the circulating liquid to substantially the normal or initial temperature, suitable means being provided for indicating the rise in temperature of the circulating liquid due to the heat of the gas.

By the term "closed circulation" as used in the claims is meant a repeated circulation over and over of the same body of water in contradistinction to the continuous flow of a stream of liquid from an inlet to an outlet.

Having thus described my invention, what I claim as new, and desire to secure by Letters Patent, is—

1. A pyrometer comprising a receptacle, a body of liquid contained in said receptacle, means for exposing said body of liquid at one point to a source of refrigeration, means for exposing said body of liquid at another point to a source of heat the temperature of which is to be ascertained, said receptacle being arranged for the closed circulation of said body of liquid between the source of refrigeration and the source of heat and means for ascertaining the difference in temperature between the hot and cold portions of said body of liquid.

2. A pyrometer, comprising a reservoir containing a body of liquid for closed circulation, a gas-passage to which said body of liquid is exposed at one part of said reservoir, a cooling-body to which said circulating liquid is exposed at another part of said reservoir and means for ascertaining the difference in temperature between the hot and cold portions of said body of liquid.

3. A pyrometer, comprising a pipe for the passage of hot gas the temperature of which is to be ascertained, a reservoir, a body of liquid within said reservoir exposed at one portion to said pipe, means for reducing the temperature of said liquid at another portion, said reservoir being arranged for the closed circulation of said body of liquid between said hot and cold portions and a thermometer for ascertaining the temperature of the liquid at the hot portion thereof.

4. A pyrometer comprising a pipe for the passage of hot gas, the temperature of which is to be ascertained, a reservoir containing a body of liquid, a diaphragm within said reservoir about which said body of liquid is maintained in closed circulation, said body of liquid being exposed on one side of said diaphragm to said pipe, means on the other side of said diaphragm for cooling said body of circulating liquid and a thermometer for ascertaining the temperature of said body of liquid at the hot portion thereof.

5. A pyrometer, comprising a pipe for the passage of gas, a reservoir surrounding said pipe and containing a body of liquid for closed circulation, a tubular diaphragm or partition about said pipe, around which diaphragm or partition the liquid within the reservoir will circulate, an external liquid-tight jacket or casing about said reservoir and a thermometer for indicating the rise of temperature at the hot portion of the said body of liquid.

6. A pyrometer, comprising a pipe for the passage of gas, a reservoir containing a body of liquid for closed circulation exposed at one part to said pipe, a diaphragm within said reservoir and around which said liquid will circulate, said diaphragm being formed of material of low heat conductivity, means for cooling the circulating liquid at another part, and means for ascertaining the difference in temperature between the hot and cold portions of said body of liquid.

7. A pyrometer, comprising a pipe for the passage of gas, a reservoir surrounding said pipe and containing a body of liquid for closed circulation, a tubular diaphragm within said reservoir and surrounding said pipe, means outside of said diaphragm for cooling the circulating liquid within the reservoir and a thermometer at the top of said reservoir for ascertaining the rise of temperature of hot portion of the body of liquid.

8. A pyrometer, comprising a pipe for the passage of gas, a reservoir surrounding said pipe and containing a body of liquid for closed circulation, a tubular open-ended diaphragm within said reservoir, a water-jacket surrounding said reservoir, a thermometer at the top and a thermometer at the bottom of said reservoir for ascertaining the difference in temperature between the hot and cold portions of said body of liquid.

9. A pyrometer, comprising a reservoir containing a body of liquid for closed circulation, a gas-passage to which said body of liquid is exposed at one part of said reservoir, a regulating-valve in said gas-passage, a cooling-body to which said circulating liquid is exposed at another part of said reservoir and means for ascertaining the difference in temperature between the hot and cold portions of said body of liquid.

10. A pyrometer comprising a pipe for the passage of hot gas, a reservoir surrounding said pipe and containing a body of distilled water for closed circulation, a tubular diaphragm within said reservoir and about said pipe, means outside of said diaphragm for cooling said body of water and means for ascertaining the difference in temperature between the hot and cold portions of said body of water.

JASPER WHITING.

Witnesses:
GEO. P. FISHER, Jr.,
ALBERTA ADAMICK.